US010241547B2

(12) United States Patent
Hsu

(10) Patent No.: US 10,241,547 B2
(45) Date of Patent: Mar. 26, 2019

(54) ROTARY SHAFT LINK DEVICE

(71) Applicant: FIRST DOME CORPORATION, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 261 days.

(21) Appl. No.: 15/271,406

(22) Filed: Sep. 21, 2016

(65) Prior Publication Data

US 2018/0032110 A1 Feb. 1, 2018

(30) Foreign Application Priority Data

Jul. 27, 2016 (TW) .............................. 105211311 A

(51) Int. Cl.
| G06F 1/16 | (2006.01) |
| E05D 3/12 | (2006.01) |
| E05D 5/10 | (2006.01) |
| E05D 11/00 | (2006.01) |
| F16H 19/04 | (2006.01) |
| H04M 1/02 | (2006.01) |

(52) U.S. Cl.
CPC ........... *G06F 1/1681* (2013.01); *E05D 3/122* (2013.01); *E05D 5/10* (2013.01); *E05D 11/0054* (2013.01); *G06F 1/1616* (2013.01); *E05D 2005/106* (2013.01); *E05Y 2900/606* (2013.01); *F16H 19/04* (2013.01); *H04M 1/022* (2013.01); *H04M 1/0216* (2013.01); *Y10T 16/541* (2015.01)

(58) Field of Classification Search
CPC ..... Y10T 16/541; Y10T 16/547; E05D 3/122; E05D 5/10; E05D 11/0054; E05D 2005/106; E05Y 2900/606; G06F 1/1681; G06F 1/1616; F16H 19/04; H04M 1/0216; H04M 1/022; H05K 5/0226
USPC ................. 16/354, 366; 361/679.06, 679.27; 379/433.13; 455/575.3
See application file for complete search history.

(56) References Cited

U.S. PATENT DOCUMENTS

| 3,422,487 A * | 1/1969 | Dickinson ................. E05D 3/06 16/273 |
| 3,483,588 A * | 12/1969 | Hover ..................... B63B 19/19 16/354 |
| 4,599,998 A * | 7/1986 | Castillo .................. A61F 5/0123 16/354 |
| 2009/0070961 A1 * | 3/2009 | Chung .................... E05D 3/122 16/354 |
| 2015/0159413 A1 * | 6/2015 | Chen ...................... E05D 3/122 16/342 |

(Continued)

*Primary Examiner* — William L Miller
(74) *Attorney, Agent, or Firm* — Rosenberg, Klein & Lee

(57) ABSTRACT

A rotary shaft link device has a simplified structure occupying less room and is easy to assemble and includes a transmission unit disposed on a first shaft, a reaction unit disposed on a second shaft and a link unit disposed between the transmission unit and the reaction unit. Two ends of the link unit are formed with driving sections engaged with the transmission unit and the reaction unit. The link unit is assembled in the rail of the restriction plate. When the first shaft is rotated, the link unit responsively moves from a first position to a second position to drive the reaction unit and the second shaft to synchronously rotate. According to the specification of the product, the number of the link devices can be easily adjusted to achieve the object of modularized assembly.

17 Claims, 4 Drawing Sheets

(56) References Cited

U.S. PATENT DOCUMENTS

| | | | | |
|---|---|---|---|---|
| 2015/0267450 A1* | 9/2015 | Chiang | ................ | G06F 1/1681 |
| | | | | 16/354 |
| 2015/0342068 A1* | 11/2015 | Su | ........................ | G06F 1/1681 |
| | | | | 16/354 |
| 2015/0362958 A1* | 12/2015 | Shang | ................... | G06F 1/1681 |
| | | | | 361/679.58 |
| 2016/0011632 A1* | 1/2016 | Hsu | ........................ | E05D 3/122 |
| | | | | 16/354 |
| 2016/0032633 A1* | 2/2016 | Hsu | ........................ | E05D 3/122 |
| | | | | 16/368 |
| 2016/0060927 A1* | 3/2016 | Xu | ........................ | E05D 3/122 |
| | | | | 361/679.55 |
| 2017/0235337 A1* | 8/2017 | Vic | .......................... | E05D 3/12 |
| | | | | 361/679.55 |

* cited by examiner

ROTARY SHAFT LINK DEVICE

BACKGROUND OF THE INVENTION

1. Field of the Invention

The present invention relates generally to a rotary shaft link device, and more particularly to a rotary shaft link device including a first shaft and a second shaft. The first shaft has a transmission unit and the second shaft has a reaction unit. A link unit is disposed between the transmission unit of the first shaft and the reaction unit of the second shaft. When the first shaft is rotated, the link unit responsively moves between a first position and a second position. The cooperative space between the components of the rotary shaft link device is minified to enhance the transmission stability.

2. Description of the Related Art

There are various electronic apparatuses provided with covers or display screens, such as mobile phones, notebooks, PDA and electronic books. The covers or display screens are pivotally mounted on the electronic apparatuses via pivot pins or rotary shafts, whereby the covers or the display screens can be freely rotated and opened/closed under external force.

In order to operate the display module (such as the screen) and/or the apparatus body module of the electronic apparatus in more operation modes to widen the application range thereof, a conventional dual-shaft mechanism mounted between the display module and the apparatus body module has been developed to rotate the display module and/or the apparatus body module by different angles in accordance with different operation modes.

With respect to the operation, motion and structural design of such dual-shaft mechanism or pivot shaft assembly, the conventional dual-shaft mechanism includes an assembly of multiple rotary shafts, gears and link plates for transmitting power, whereby the rotary shafts can synchronously rotate. In order to meet the requirements for lightweight and thin structure of the electronic apparatus, the rotary shafts and the relevant connection components and the gears and link plates for transmitting power are as minified as possible so that the electronic apparatus can have a simplified structure and beautiful appearance.

However, as well known by those who are skilled in this field, the minimization of the gears and link plates will lead to reduction of the engagement/transmission working depth between these components. As a result, the structural strength of the gears will be obviously weakened and the use lifetime of the gears will be shortened. This is unbeneficial to the cooperation and power transmission between the gears and often causes an idling travel due to rotational slippage. Also, the operational hand feeling of a user will be deteriorated.

Especially, when a user operates the display module to rotate, the multiple gears and link plates are driven to drive the rotary shafts, whereby the apparatus body module is driven to synchronously rotate. The rotary shafts are assembled with the multiple gears and link plates for transmitting power so that the structural relationship between these components is relatively complicated. These components not only are troublesome to assemble, but also have larger volume to occupy much room. This is not what we expect.

To speak representatively, the conventional rotary shaft or pivot shaft structure and the relevant connection components thereof have some shortcomings in use and structural design. The rotary shaft structure and the relevant components can be redesigned to eliminate these shortcomings. For example, in condition that the requirement for lightweight and thin design of the electronic apparatus is satisfied and the structure can be synchronously operated, the cooperative gaps or motional ranges between all the rotary shafts and the components are as minified as possible. In this case, the entire electronic apparatus can be designed with a simplified structure and beautiful appearance to improve the shortcoming of the conventional rotary shaft structure that the components have larger volume and occupy much room. Moreover, in condition of easy assembly, according to the specification of the product, the number of the link devices can be easily changed or adjusted to achieve the object of modularized assembly. Therefore, the shortcomings of the conventional rotary shaft or pivot shaft structure can be eliminated. Also, the structure and the use form of the conventional rotary shaft or pivot shaft can be changed to widen the application range thereof.

SUMMARY OF THE INVENTION

It is therefore a primary object of the present invention to provide a rotary shaft link device has a simplified structure occupying less room and is easy to assemble and includes a transmission unit disposed on a first shaft, a reaction unit disposed on a second shaft and a link unit disposed between the transmission unit and the reaction unit. Two ends of the link unit are formed with driving sections engaged with the transmission unit and the reaction unit. The link unit is assembled in the rail of the restriction plate. When the first shaft is rotated, the link unit responsively moves from a first position to a second position to drive the reaction unit and the second shaft to synchronously rotate. The rotary shaft link device forms a system, which can be smoothly opened and closed. According to the specification of the product, the number of the link devices can be easily adjusted to achieve the object of modularized assembly.

In the above rotary shaft link device, the transmission unit of the first shaft and the reaction unit of the second shaft are gears. The link unit is a plate-like body. Two ends of the link unit are formed with driving sections as a row of tooth structures for respectively engaging with the transmission unit and the reaction unit. Each of the first and second shafts has an assembled section and a pivoted section. A torque module is mounted on the assembled sections. The transmission unit and the reaction unit are disposed between the assembled sections and the pivoted sections. The tail end sections of the pivoted sections are formed with rectangular cross-sectional structures.

In the above rotary shaft link device, the link unit is disposed between two restriction plates. Support sections protrude from two sides of the link unit. The support sections are assembled in the rails of the restriction plates. The link unit or the support sections are permitted to reciprocally move along the rails.

The present invention can be best understood through the following description and accompanying drawings, wherein:

DETAILED DESCRIPTION OF THE PREFERRED EMBODIMENTS

Figure 1:
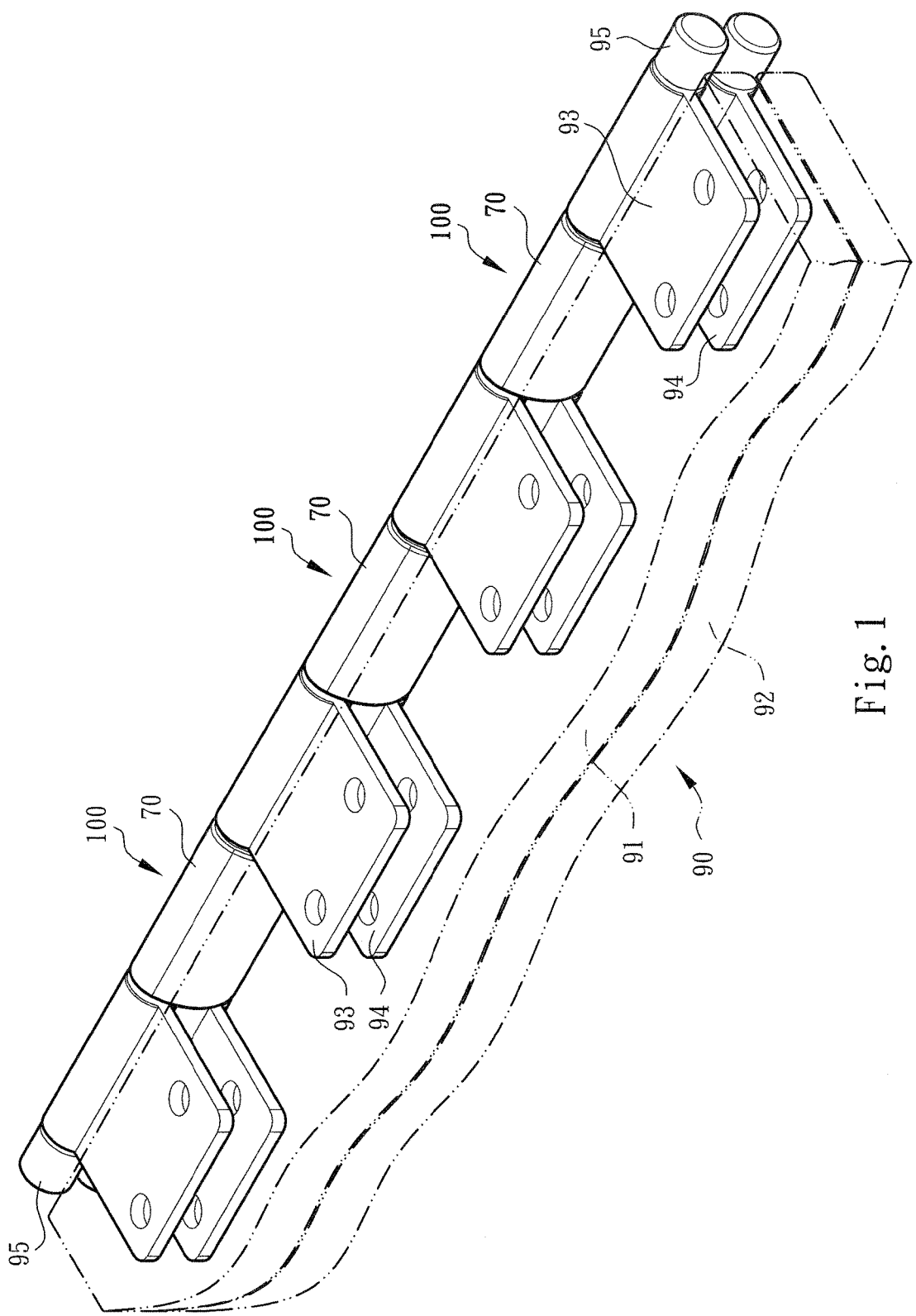
FIG. 1 is a perspective assembled view of the present invention, in which the phantom lines show the display module and apparatus body module of the electronic apparatus.
Figure 2:
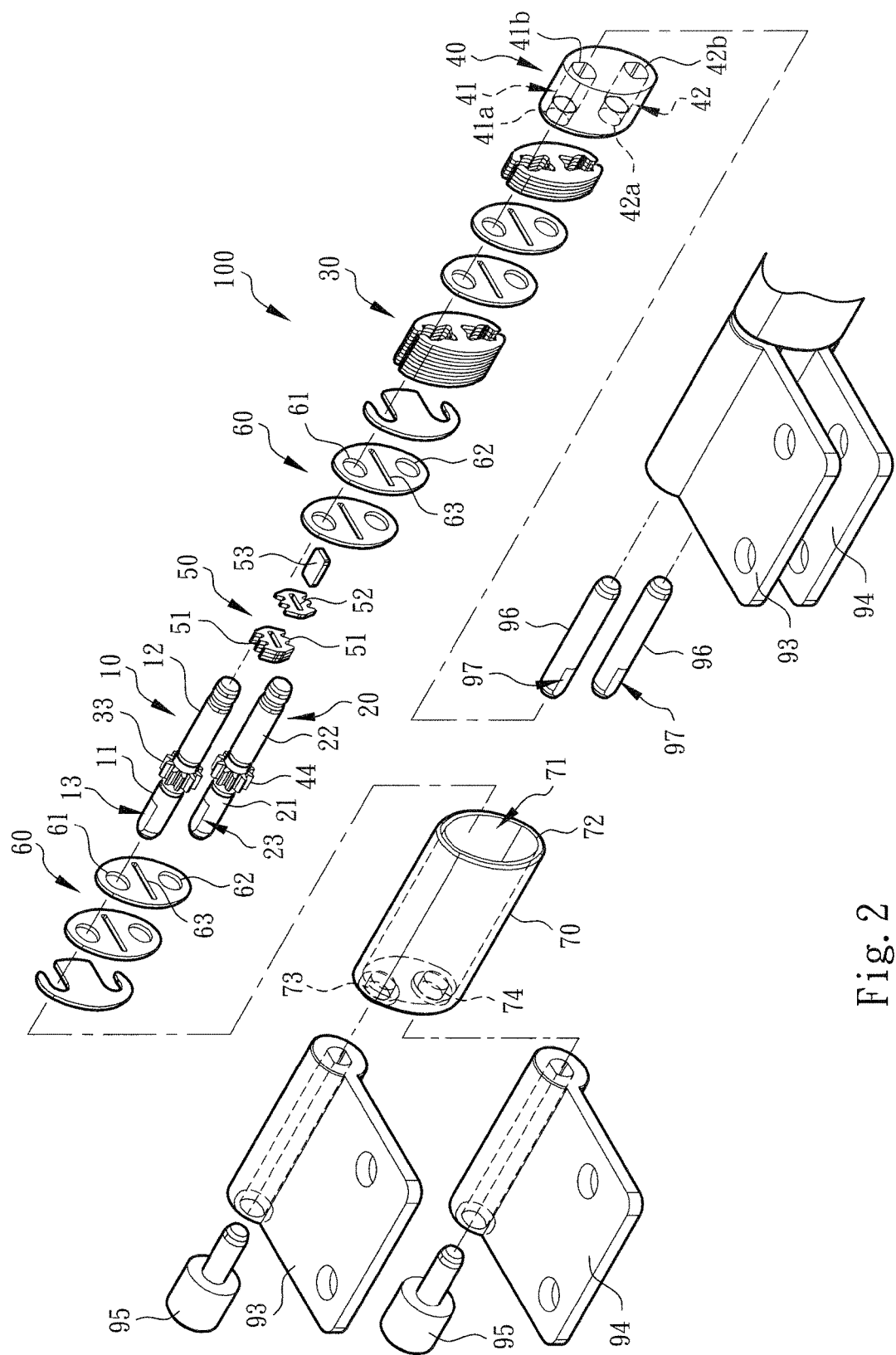
FIG. 2 is a perspective exploded view of the present invention, showing the structures of the first and second shafts, the transmission unit, the reaction unit, the link unit and the restriction plates.
Figure 3:
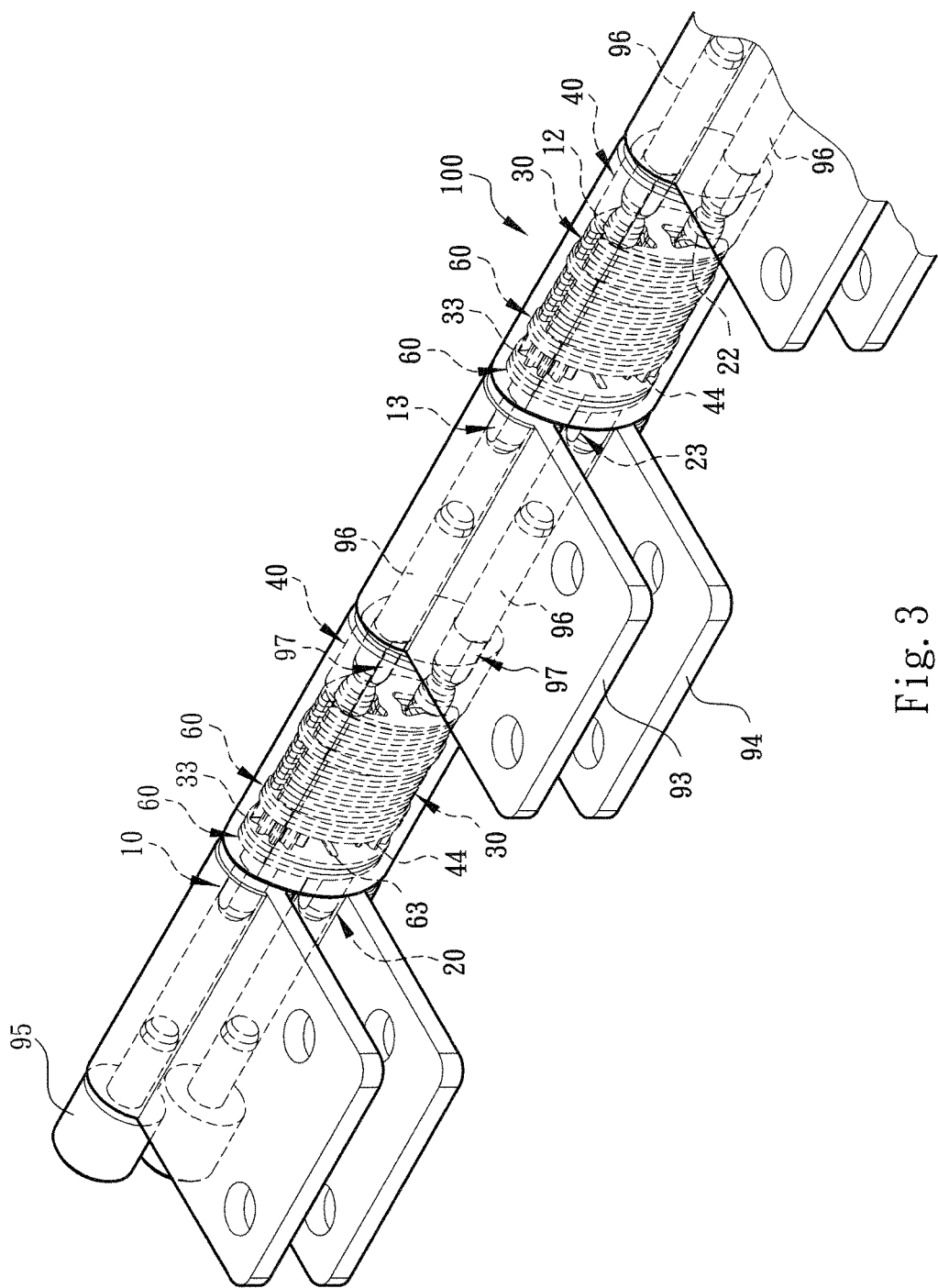
FIG. 3 is a perspective assembled view of the present invention, showing that the link device is assembled with the fixing plates.

Please refer to FIGS. 1, 2 and 3. The rotary shaft link device of the present invention includes an assembly of multiple modularized link devices 100. Each link device 100 includes a first shaft 10 and a second shaft 20 in parallel to the first shaft 10. Each of the first and second shafts 10, 20 has a pivoted section 11, 21 and an assembled section 12, 22. The tail end section 13, 23 of the pivoted section 11, 21 is formed with a rectangular cross-sectional structure. The assembled section 12, 22 is assembled with a torque module 30 and a driven module 40. When the action force applied by a user to the first and second shafts 10, 20 for operating/rotating the first and second shafts 10, 20 disappears, the torque module 30 immediately locates the first and second shafts 10, 20.

In this embodiment, the first shaft 10 has a transmission unit 33 disposed between the pivoted section 11 and the assembled section 12. The second shaft 20 has a reaction unit 44 disposed between the pivoted section 21 and the assembled section 22. The transmission unit 33 and the reaction unit 44 are gear structures. In addition, a link unit 50 is disposed between the transmission unit 33 of the first shaft 10 and the reaction unit 44 of the second shaft 20, whereby the first and second shafts 10, 20 can synchronously rotate.

To speak more specifically, the link unit 50 is at least one plate-like body or an assembly of multiple plate-like bodies. As shown in the drawings, each of the upper and lower ends of the link unit 50 is formed with a driving section 51 as a row of tooth structures. The driving sections 51 of the upper and lower ends of the link unit 50 are respectively engaged or assembled with the transmission unit 33 of the first shaft 10 and the reaction unit 44 of the second shaft 20. A support section 53 protrudes from at least one side or two sides of the link unit 50. Alternatively, the link unit 50 is formed with an assembling hole 52 for assembling with the support section 53.

As shown in the drawings, restriction plates 60 are disposed on the pivoted section 11 and the assembled section 12 of the first shaft (or at least one side or two sides of the transmission unit 33) and the pivoted section 21 and the assembled section 22 of the second shaft (or at least one side or two sides of the reaction unit 44). Two ends of each restriction plate 60 are formed with shaft holes 61, 62 for pivotally connecting with the first and second shafts 10, 20 respectively. A middle section of the restriction plate 60 (between the two shaft holes 61, 62) is formed with a rail 63 normal to the axis of the restriction plate 60. The rail 63 serves to receive the support section 53 of the link unit 50, whereby the support section 53 and the link unit 50 are permitted to reciprocally move along the rail 63.

In a preferred embodiment, the driven module 40 of the assembled section 12 of the first shaft and the assembled section 22 of the second shaft is a sleeve structure. According to the direction of FIG. 2, the driven module 40 is formed with an internal upper shaft hole 41 and an internal lower shaft hole 42. The upper and lower shaft holes 41, 42 are respectively formed with circular cross-sectional sections 41a, 42a and rectangular cross-sectional sections 41b, 42b.

The first and second shafts 10, 20, the torque module 30, the driven module 40, the link unit 50 and the restriction plates 60 are together enclosed in an interior space 71 of a case 70 to form the link device 100. Therefore, according to the specification of the electronic apparatus 90, the number of the modularized link devices 100 can be adjusted and the modularized link devices 100 can be applied and assembled with two fixing plates 93, 94 to achieve an opening/closing system of the electronic apparatus 90. The case 70 has an opening 72 in communication with the interior space 71. According to the direction of the drawings, the other side of the case 70 is formed with an upper shaft hole 73 and a lower shaft 74 opposite to the opening 72 for pivotally connecting with the pivoted sections 11, 21 of the first and second shafts respectively.

Referring to FIGS. 1, 2 and 3, the two fixing boards 93, 94 are positioned at two ends of the electronic apparatus 90 and assembled with shaft pins 95. In a preferred embodiment, the fixing plates 93, 94 are assembled with subsidiary shafts 96 to help in rotating/operating the fixing plates 93, 94 and the first and second shafts 10, 20. Each subsidiary shaft 96 has a tail end section 97 formed with a rectangular cross-sectional structure. The rectangular cross-sectional structure can be inserted into the rectangular cross-sectional sections 41b and/or 42b of the driven module 40.

Please refer to FIGS. 1, 2 and 3. In the case that multiple link devices 100 are assembled with the display module 91 and apparatus body module 92 of the electronic apparatus 90, the pivoted section 11 of the first shaft 10 (or the tail end section 13 of the first shaft 10) is pivotally connected with the fixing plate 93 and assembled with the display module 91. The pivoted section 21 of the second shaft 20 (or the tail end section 23 of the second shaft 20) is pivotally connected with the other fixing plate 94 and assembled with the apparatus body module 92.

As shown in the drawings, the other ends of the two fixing plates 93, 94 are pivotally connected with the subsidiary shafts 96. The tail end sections 97 of the subsidiary shafts 96 are inserted in the driven module 40 (or the rectangular cross-sectional sections 41b and/or 42b) of another link device 100.

Figure 4:
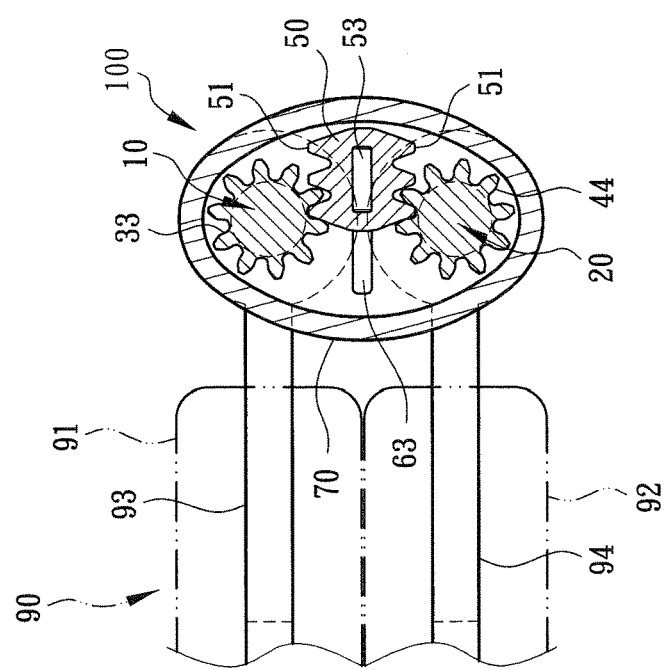
FIG. 4 is a sectional view of the present invention, showing that the display module and the apparatus body module are positioned in a closed position.

Please refer to FIGS. 3 and 4. When the display module 91 and the apparatus body module 92 are positioned in a closed position, the transmission unit 33 of the first shaft 10 and the reaction unit 44 of the second shaft 20 are respectively engaged with the driving sections 51 of the link unit 50. At this time, the position of the link unit 50 of the link device 100 in the rail 63 is defined as a first position.

Figure 5:
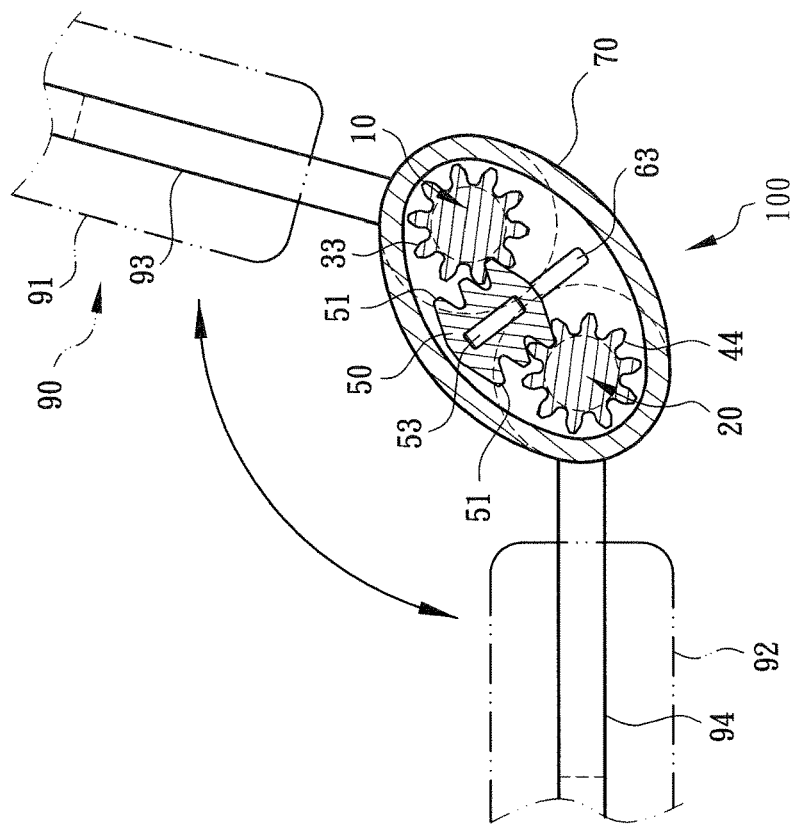
FIG. 5 is a sectional view of the present invention according to FIG. 4, showing that the display module and the apparatus body module are moved to an opened position.

Please now refer to FIG. 5, which shows that the display module 91 or the apparatus body module 92 drives the fixing board 93 or the fixing board 94 to move to an opened position. At this time, the link unit 50 is moved along the rail 63 from the first position to a second position opposite to the first position.

To speak more specifically, when the display module 91 drives the fixing board 93 and the pivoted section 11 (the tail end section 13 with rectangular cross-section) of the first shaft to move or (clockwise) rotate to the opened position, the transmission unit 33 of the first shaft 10 drives the link unit 50 to move along the rail 63 from the first position to the second position, whereby the link unit 50 drives the reaction unit 44 and the second shaft 20 to rotate in a direction reverse to the rotational direction of the first shaft 10, (that is, the second shaft 20 is counterclockwise rotated).

It should be noted that the length or range of the rail 63 is changeable or adjustable so as to control the travel of the link unit 50 and the opening angle of the display module 91 and the apparatus body module 92.

According to the above arrangement, in condition of synchronous rotation in operation, in comparison with the conventional rotary shaft structure, the rotary shaft link device of the present invention has the following advantages:

1. The rotary shaft link device and the relevant components/structures have been redesigned to be different from the conventional rotary shaft structure. For example, the first shaft 10 of the link device 100 has a transmission unit 33 and the second shaft 20 of the link device 100 has a reaction unit 44. The plate-like link unit 50 is engaged between the transmission unit 33 and the reaction unit 44. Each link unit 50 has driving sections 51 as a row of tooth structures and a protruding support section 53, whereby the link unit 50 is reciprocally movable along the rail 63 of the restriction plate 60 between the first and second positions. The driven module 40 is formed with an upper shaft hole 41 and a lower shaft hole 42. The upper and lower shaft holes 41, 42 are respectively formed with circular cross-sectional sections 41*a*, 42*a* and rectangular cross-sectional sections 41*b*, 42*b*. The fixing plates 93, 94 are pivotally connected with the first and second shafts 10, 20 and the subsidiary shafts 96. This is obviously different from the structural form of the transmission mechanism of the conventional rotary shaft.

2. Especially, the rotary shaft link device meets the requirements for lightweight and thin design of electronic apparatus. This is achieved in such a manner that in cooperation with the link unit 50, the cooperative gaps or motional ranges between the rotary shafts and the components are as minified as possible. That is, the gap or the cooperative structure between the transmission units 33 of the first shaft 10 and the reaction units 44 of the second shaft 20 is as minified as possible. In this case, the entire electronic apparatus 90 can be designed with a simplified structure and beautiful appearance to improve the shortcoming of the conventional rotary shaft structure that the components have larger volume and occupy much room. Moreover, in condition of easy assembly, according to the specification of the product (or the electronic apparatus), the number of the link devices 100 can be easily changed or adjusted to achieve the object of modularized assembly and easy production.

3. The first and second shafts 10, 20, the link unit 50, the restriction plates 60, the torque module 30 and the driven module 40 are assembled and enclosed in the case 70. The case 70 can move in accordance with the rotation/operation of the display module 91 and the apparatus body module 92. In this case, the link device 100 has a tidy appearance and provides a decorative effect. Also, the lubricant applied to the link device 100 is uneasy to leak outsides.

In conclusion, the rotary shaft link device of the present invention is effective and different from the conventional rotary shaft structure in space form. The rotary shaft link device of the present invention is inventive, greatly advanced and advantageous over the conventional rotary shaft structure.

The above embodiments are only used to illustrate the present invention, not intended to limit the scope thereof. Many modifications of the above embodiments can be made without departing from the spirit of the present invention.

What is claimed is:

1. A rotary shaft link device comprising a first shaft, a transmission unit disposed on the first shaft, a second shaft in parallel to the first shaft and a reaction unit disposed on the second shaft, each of the first and second shafts having a pivoted section and an assembled section, at least one link unit in the form of a plate-shaped body being disposed between the transmission unit of the first shaft and the reaction unit of the second shaft, upper and lower ends of the link unit being formed with driving sections respectively engaged with the transmission unit of the first shaft and the reaction unit of the second shaft, whereby when the first shaft is rotated, the link unit responsively moves from a first position to a second position to drive the reaction unit and the second shaft to synchronously rotate, a tail end section of the pivoted section of the first shaft being formed with a rectangular cross-sectional structure and a tail end section of the pivoted section of the second shaft also being formed with a rectangular cross-sectional structure, the assembled sections of the first and second shafts being assembled with a torque module and a driven module, the transmission unit being disposed between the pivoted section and assembled section of the first shaft, the reaction unit being disposed between the pivoted section and assembled section of the second shaft.

2. The rotary shaft link device as claimed in claim 1, wherein the transmission unit and the reaction unit are gear structures, the driving sections formed at the upper and lower ends of the link unit being formed as a row of tooth structures and respectively engaged with the transmission unit of the first shaft and the reaction unit of the second shaft, a support section protruding from at least one side of the link unit or the link unit being formed with an assembling hole for assembling with a support section, restriction plates being disposed on at least one side of the transmission unit and at least one side of the reaction unit, two ends of each restriction plate being formed with shaft holes for pivotally connecting with the first and second shafts respectively, a middle section of each restriction plate being formed with a rail normal to an axis of the restriction plate, the rail serving to receive the support section of the link unit, whereby the support section is permitted to reciprocally move along the rail.

3. The rotary shaft link device as claimed in claim 2, wherein the driven module is a sleeve structure, the driven module being formed with an internal upper shaft hole and an internal lower shaft hole, the upper and lower shaft holes being respectively formed with circular cross-sectional sections and rectangular cross-sectional sections.

4. The rotary shaft link device as claimed in claim 3, wherein the first and second shafts, the link unit and the restriction plates are together enclosed in an interior space of a case, the case having an opening in communication with the interior space, the other side of the case being formed with an upper shaft hole and a lower shaft opposite to the opening for pivotally connecting with the pivoted sections of the first and second shafts respectively.

5. The rotary shaft link device as claimed in claim 4, wherein the first shaft is pivotally connected with a fixing board to assemble with a display module of an electronic apparatus, the second shaft being pivotally connected with another fixing board to assemble with an apparatus body module of the electronic apparatus, the other ends of the two fixing boards being pivotally connected with subsidiary shafts, each subsidiary shaft having a tail end section formed with a rectangular cross-sectional structure.

6. The rotary shaft link device as claimed in claim 3, wherein the first and second shafts, the torque module, the driven module, the link unit and the restriction plates are together enclosed in an interior space of a case, the case having an opening in communication with the interior space, the other side of the case being formed with an upper shaft hole and a lower shaft opposite to the opening for pivotally connecting with the pivoted sections of the first and second shafts respectively.

7. The rotary shaft link device as claimed in claim 6, wherein the tail end section of the first shaft is pivotally connected with a fixing board to assemble with a display module of an electronic apparatus, the tail end section of the second shaft being pivotally connected with another fixing board to assemble with an apparatus body module of the electronic apparatus, the other ends of the two fixing boards being pivotally connected with subsidiary shafts, each subsidiary shaft having a tail end section formed with a rectangular cross-sectional structure.

8. The rotary shaft link device as claimed in claim 3, wherein the tail end section of the first shaft is pivotally connected with a fixing board to assemble with a display module of an electronic apparatus, the tail end section of the second shaft being pivotally connected with another fixing board to assemble with an apparatus body module of the electronic apparatus, the other ends of the two fixing boards being pivotally connected with subsidiary shafts, each subsidiary shaft having a tail end section formed with a rectangular cross-sectional structure.

9. The rotary shaft link device as claimed in claim 2, wherein the first and second shafts, the link unit and the restriction plates are together enclosed in an interior space of a case, the case having an opening in communication with the interior space, the other side of the case being formed with an upper shaft hole and a lower shaft opposite to the opening for pivotally connecting with the pivoted sections of the first and second shafts respectively.

10. The rotary shaft link device as claimed in claim 9, wherein the first shaft is pivotally connected with a fixing board to assemble with a display module of an electronic apparatus, the second shaft being pivotally connected with another fixing board to assemble with an apparatus body module of the electronic apparatus, the other ends of the two fixing boards being pivotally connected with subsidiary shafts, each subsidiary shaft having a tail end section formed with a rectangular cross-sectional structure.

11. The rotary shaft link device as claimed in claim 2, wherein the first and second shafts, the torque module, the driven module, the link unit and the restriction plates are together enclosed in an interior space of a case, the case having an opening in communication with the interior space, the other side of the case being formed with an upper shaft hole and a lower shaft opposite to the opening for pivotally connecting with the pivoted sections of the first and second shafts respectively.

12. The rotary shaft link device as claimed in claim 11, wherein the tail end section of the first shaft is pivotally connected with a fixing board to assemble with a display module of an electronic apparatus, the tail end section of the second shaft being pivotally connected with another fixing board to assemble with an apparatus body module of the electronic apparatus, the other ends of the two fixing boards being pivotally connected with subsidiary shafts, each subsidiary shaft having a tail end section formed with a rectangular cross-sectional structure.

13. The rotary shaft link device as claimed in claim 2, wherein the first shaft is pivotally connected with a fixing board to assemble with a display module of an electronic apparatus, the second shaft being pivotally connected with another fixing board to assemble with an apparatus body module of the electronic apparatus, the other ends of the two fixing boards being pivotally connected with subsidiary shafts, each subsidiary shaft having a tail end section formed with a rectangular cross-sectional structure.

14. The rotary shaft link device as claimed in claim 1, wherein the driven module is a sleeve structure, the driven module being formed with an internal upper shaft hole and an internal lower shaft hole, the upper and lower shaft holes being respectively formed with circular cross-sectional sections and rectangular cross-sectional sections.

15. The rotary shaft link device as claimed in claim 14, wherein the tail end section of the first shaft is pivotally connected with a fixing board to assemble with a display module of an electronic apparatus, the tail end section of the second shaft being pivotally connected with another fixing board to assemble with an apparatus body module of the electronic apparatus, the other ends of the two fixing boards being pivotally connected with subsidiary shafts, each subsidiary shaft having a tail end section formed with a rectangular cross-sectional structure.

16. The rotary shaft link device as claimed in claim 1, wherein the first shaft is pivotally connected with a fixing board to assemble with a display module of an electronic apparatus, the second shaft being pivotally connected with another fixing board to assemble with an apparatus body module of the electronic apparatus, the other ends of the two fixing plates boards being pivotally connected with subsidiary shafts, each subsidiary shaft having a tail end section formed with a rectangular cross-sectional structure.

17. The rotary shaft link device as claimed in claim 1, wherein the tail end section of the first shaft is pivotally connected with a fixing board to assemble with a display module of an electronic apparatus, the tail end section of the second shaft being pivotally connected with another fixing board to assemble with an apparatus body module of the electronic apparatus, the other ends of the two fixing boards being pivotally connected with subsidiary shafts, each subsidiary shaft having a tail end section formed with a rectangular cross-sectional structure.

\* \* \* \* \*